Aug. 5, 1941.    J. H. SCHARFFENBERG    2,251,425
MOLDING MACHINE
Filed April 8, 1940
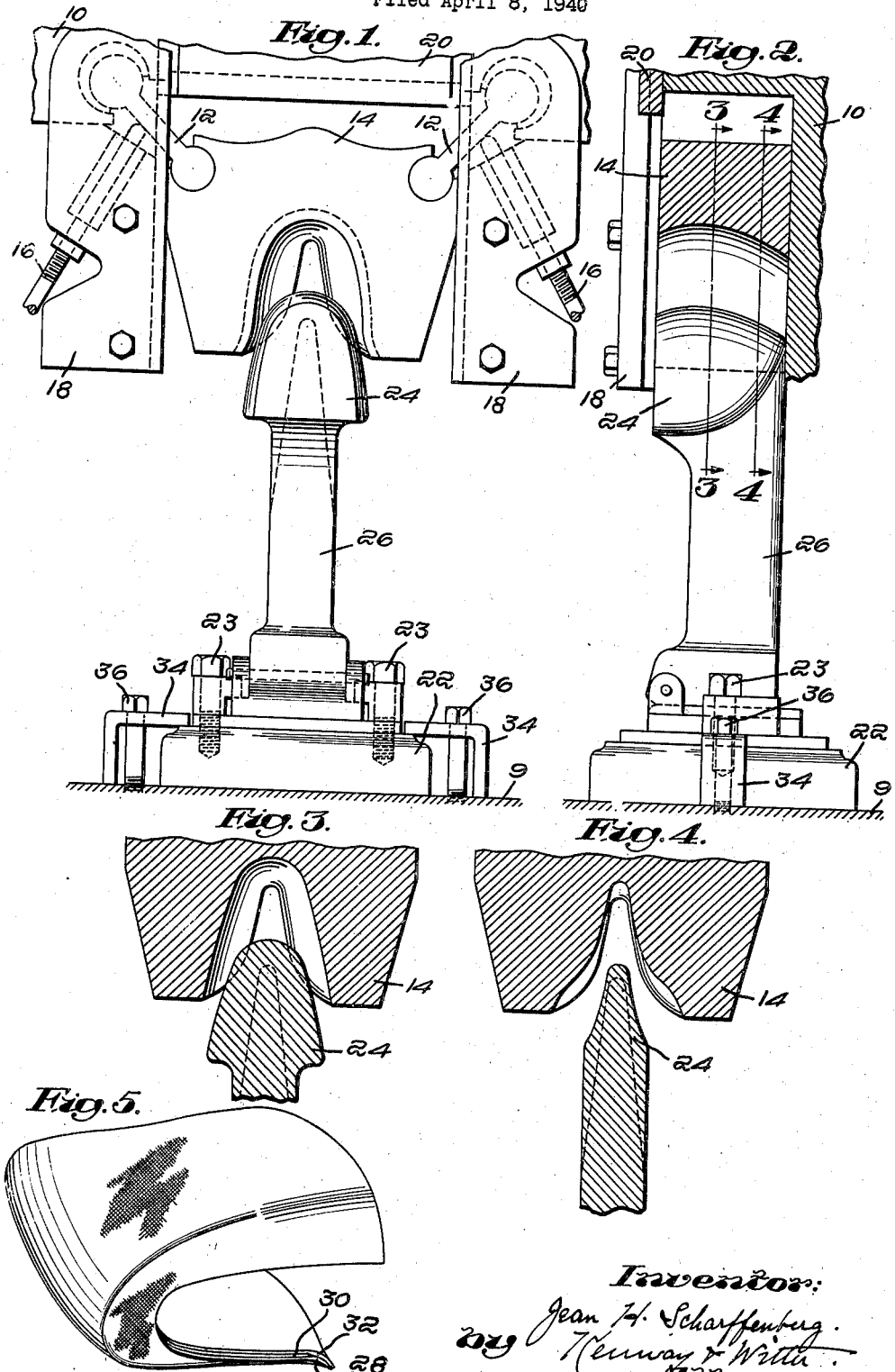

Patented Aug. 5, 1941

2,251,425

UNITED STATES PATENT OFFICE 2,251,425

MOLDING MACHINE

Jean H. Scharffenberg, Lynn, Mass., assignor to Stewart Bros. Inc. of Lynn, Lynn, Mass., a corporation of Massachusetts Application April 8, 1940, Serial No. 328,455

2 Claims. (Cl. 12—66)

My invention relates to machines for molding such articles as shoe counters, shoe quarters, box toes, or the like, and consists in an improved combination of molds useful for such work. The invention is herein disclosed in its application to a molding machine of the type known as the "Stewart counter molding machine," although it is in no sense limited to that or to any particular type of molding machine.

In previous counter molding machines it has been the practice to employ a two part female mold, the parts being movably connected and mounted in the machine with the mold as a whole opening downwardly. A male mold or plug is arranged to move upwardly into the cavity of the female mold, whereupon the parts of the female mold are closed under powerful pressure upon a counter blank carried on the plug. An improved machine of this type is described in U. S. Letters Patent No. 2,185,937 granted upon an application of C. W. Bailey, and in one aspect my invention comprises a combination of molds adapted to replace the molds described in said patent.

Heretofore it has been difficult to mold a pronounced vertical curve in the rear of a counter or quarter, because the adjacent edges of the two parts of the mold tend in closing to nip the stock and form a projecting fin in the back of the counter or quarter. The fin becomes more pronounced as the vertical curve of the rear of the counter is increased and is more pronounced near the upper and lower edges of the molded counter than near the center thereof.

Although a fin on a counter stiffener is covered in the usual course of shoemaking when the upper is disposed over it, the presence of a fin is a serious defect when the upper and counter stiffener are molded as a unit, because it is clearly visible in the finished shoe. Furthermore if fabric or delicate leather is used for the upper, the nipping action of the edges of the molds causes breakage and cracking of the upper.

An important object of my invention is to provide molds for a counter molding machine which will impart a pronounced vertical convexity to the rear of a counter or quarter without forming a fin thereon.

To accomplish the objects of the invention I provide a solid female mold having a V-shaped cavity with its inner end sharply concaved between the faces of the mold and all longitudinal sections of the cavity being divergent to provide withdrawing clearance for the plug. The plug has a shape complementary to that of the cavity in the female mold and the crown thereof is sharply convex from front to rear. Since the outer or female mold is solid there is no possibility that a fin will be formed, regardless of the configuration of the mold cavity.

An important feature of my invention is the fact that my improved molds are of the same size and shape as the molds regularly used on a Stewart molding machine so that the molds can easily and quickly be applied to machines previously constructed and now in use.

These and other objects and features of my invention will be more readily understood and appreciated from the following detailed description of a preferred embodiment thereof selected for purposes of illustration and shown in the accompanying drawing, in which—

Fig. 1 is a view in front elevation of a portion of a counter molding machine equipped with the molds of my invention, Fig. 2 is a view partly in side elevation and partly in section showing the molds, Fig. 3 is a view in cross section along the line 3—3 of Fig. 2, Fig. 4 is a view in cross section along the line 4—4 of Fig. 2, and Fig. 5 is a view in perspective showing a molded shoe quarter.

The general organization and construction of the molding machine forms no part of my invention, and for these details reference may be had to the patent to Bailey identified above. It suffices to say that the machine includes a bed 9 on which is supported a circular base 22 which supports the male mold or plug 24 provided with a reduced standard or shank 26. The plug 24 is essentially wedge-shaped or V-shaped, the side walls thereof diverging from the apex to the base. At predetermined intervals in the cycle of the molding machine the bed 11 is elevated and subsequently lowered. Upon a heavy cross girt 10 sockets for a pair of toggle links 12 are located. The outer ends of the toggle links 12 may be fitted into arcuate sockets in a solid mold member 14 so that the mold 14 is suspended from the cross girt 10 by means of the toggle links 12. Oblique adjusting screws 16 are carried by the frame of the machine and bear upon intermediate portions of the toggle links 12. It will be apparent from an inspection of Fig. 1 that by backing off one adjusting screw 16 and tightening the other, the mold 14 may be adjusted from one side to the other and properly aligned with the plug 24. On the front of the machine is a pair of guide members 18 in which slides a wiper plate 20 which is reciprocated vertically during each cycle of the machine to form a flange along the bottom of the counter by wiping the projecting margin of the blank over upon the outer flat face of the plug.

The female mold 14 is provided with a V-shaped or U-shaped cavity having side walls converging to a sharply curved apex at the innermost part thereof and shaped similarly to the rear part of a shoe but in somewhat sharper lines. The male mold or plug 24 has a complementary shape and is dimensioned to fit within the cavity in the mold 14. It will be seen in Fig. 1 that the plug 24 is substantially wedge shaped and widest at its outer face, in contrast to the shape of the conventional mold wherein the midportion has a greater breadth than the bottom of the cavity or forward end of the counter. The shape of the plug 24 is dictated by the fact that the mold 14 is solid and does not operate to close around the plug so that clearance must be provided for the entering and leaving movement of the plug.

As shown in Fig. 4 the mold cavity in the inner part of the mold is shaped with a pronounced concavity where it is to mold the U-shaped edge portion of the counter. Furthermore the molds taper from a broad base located at the face of the molds to a relatively narrow portion lying adjacent the inner faces of the molds and corresponding to the upper line of a counter. In other words, all longitudinal sections of the cavity are divergent in order to provide withdrawing clearance for the plug.

In operation a counter blank or shoe quarter is placed on the plug 24, then the bed 9 and the plug 24 are elevated in a predetermined path by means of mechanism not shown, and the plug carries the counter blank into the cavity in the female mold 14 whereupon the wedging action of the plug 24 in the cavity of the female mold forces the counter blank to assume the shape of the molds. While the counter blank is thus held tightly by the combined action of the molds 24 and 14, the wiper plate 20 slides down over the outer faces of the molds, encounters the margin of the counter blank which projects outwardly from between the molds and wipes it down to form a flange which is substantially perpendicular to the walls of the counter.

In Fig. 5 is shown a shoe quarter which has been first assembled with a counter and then molded as a unit. The quarter comprises an upper 28, a lining 30, and a fiber counter 32 held in place between the upper and the lining. The shoe quarter thus molded displays no fin whatsoever, since the solid mold 14 obviates the danger of the formation of a fin which might otherwise be caused by the nipping action of the advancing edges of a pivoted female mold section such as has heretofore been universally used. Furthermore the molded shoe quarter displays a pronounced vertical curve at its rear end, a result which is desirable from the standpoint of fine shoemaking, and this result is obtained in spite of the fact that the molding operation is performed not on a single ply of material but upon three plies, viz. an upper, a counter, and a lining.

Since the combination of a wedge-shaped plug 24 and a solid mold 14 sometimes results in the sticking of the molds when the bed 9 is lowered, I provide hold-down clamps 34 which bear on the base 22 and are anchored to the bed 9 by bolts 36. It is understood that the plug 24 and its standard 26 are firmly fastened to the base 22 by bolts 23.

The provision of the adjusting screws 16 renders is easily possible to align the female mold 14 with respect to the plug 24 so that the entrance of the plug 24 into the cavity of the mold 14 is facilitated and binding is eliminated.

In order to replace the pivoted molds heretofore used in molding machines of this type, it is only necessary to remove the guides 18, back off the adjusting screws 16 and lift out the female mold, disengaging its associated toggle links. Subsequently the mold 14 may be inserted, the guides 18 replaced, and the adjusting screws 16 manipulated properly to locate the solid mold 14. The bolts 23 are removed and the plug taken out, following which a plug of the type shown in the drawing is placed on the base 22 and the bolts 23 are again inserted.

It will now be apparent that a counter molding machine has by my invention been rendered more flexible, since it may be used with the ordinary type of molds to produce counters and quarters without a pronounced vertical curve at the rear but overmolded at the forward end. Counters with overmolded forward portions cannot be produced on a machine equipped with the molds of my invention since the walls of the molds must be wedge shaped and divergent from the top in order that the plug be removed from the cavity in the female mold. However, on a machine equipped with the molds of my invention it is possible to produce results which cannot be produced on machines heretofore used, namely counters and quarters with abrupt vertical curves at the rear.

Having thus described my invention what I claim as new and desire to secure by Letters Patent of the United States is:

1. In a counter molding machine, the combination of a cross girt, a solid female mold adjustably suspended from the cross girt and having a V-shaped cavity sharply concave at its inner end, and a complementary wedge-shaped plug mounted in the machine for movement in and out of the female mold.

2. In a counter molding machine, a plug with diverging side walls, in combination with a solid female mold having a V-shaped cavity with its inner end sharply concaved between the faces of the mold, and all longitudinal sections of the cavity being divergent to provide withdrawing clearance for the plug.

JEAN H. SCHARFFENBERG.